No. 815,211. PATENTED MAR. 13, 1906.
H. H. PATTEE & C. L. DUENKEL.
AMUSEMENT VEHICLE.
APPLICATION FILED MAY 25, 1905.
5 SHEETS—SHEET 1.
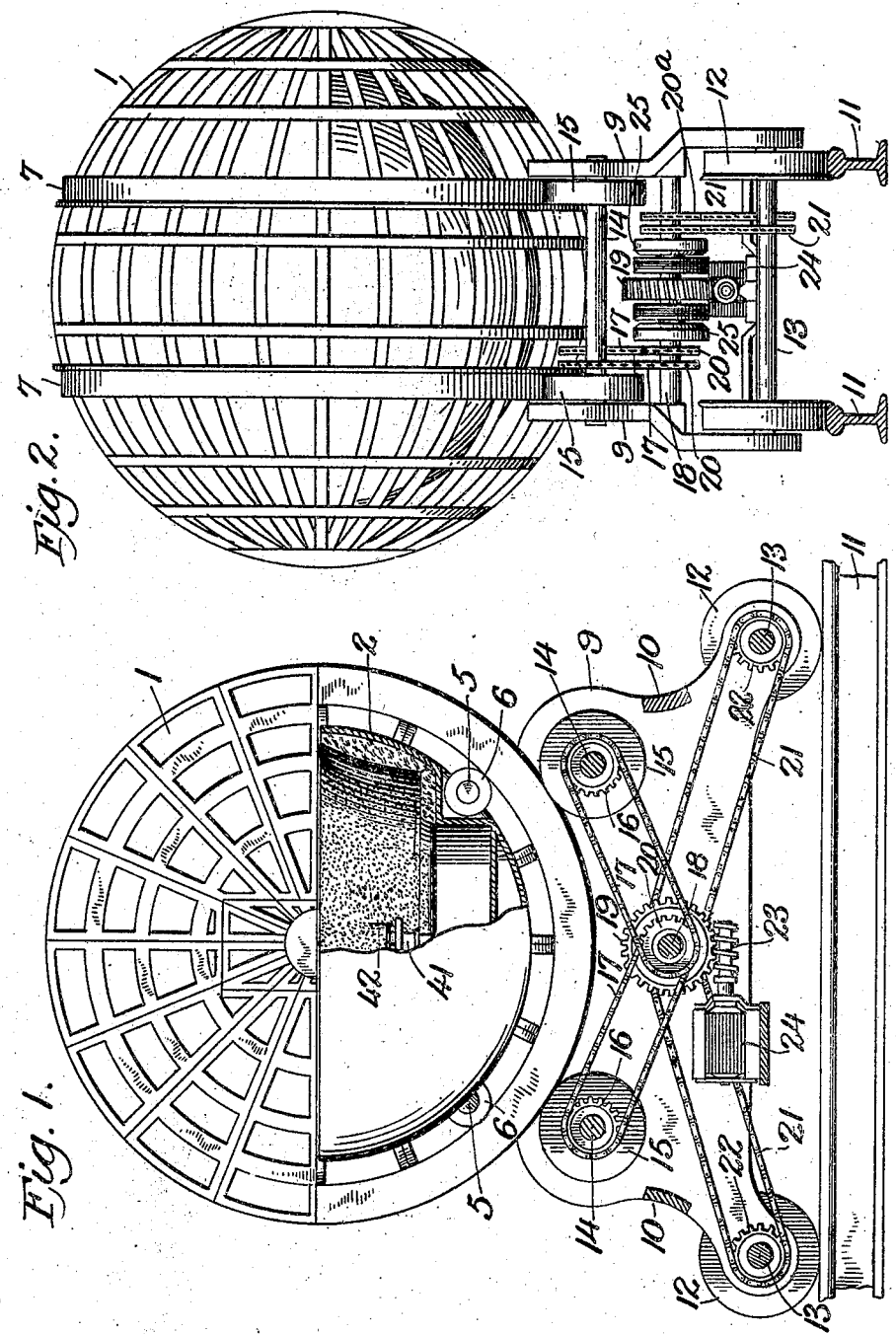
WITNESSES:
James F. Duhamel.
J. Heiberg.
INVENTORS:
Herbert H. Pattee,
Charles L. Duenkel,
By their Attorney No. 815,211. PATENTED MAR. 13, 1906.
H. H. PATTEE & C. L. DUENKEL.
AMUSEMENT VEHICLE.
APPLICATION FILED MAY 25, 1905.

5 SHEETS—SHEET 2.

No. 815,211. PATENTED MAR. 13, 1906.
H. H. PATTEE & C. L. DUENKEL.
AMUSEMENT VEHICLE.
APPLICATION FILED MAY 25, 1905.

5 SHEETS—SHEET 5.

WITNESSES:
James F. Duhamel
L. Heiberg

INVENTORS:
Herbert H. Pattee
Charles L. Duenkel,
By their Attorney
Fred A. Tucker

UNITED STATES PATENT OFFICE.

HERBERT H. PATTEE, OF EAST ORANGE, NEW JERSEY, AND CHARLES L. DUENKEL, OF NEW YORK, N. Y.

AMUSEMENT-VEHICLE.

No. 815,211.      Specification of Letters Patent.      Patented March 13, 1906.

Application filed May 25, 1905. Serial No. 262,160.

*To all whom it may concern:*

Be it known that we, HERBERT H. PATTEE, a resident of East Orange, county of Essex, State of New Jersey, and CHARLES L. DUENKEL, a resident of the city, county, and State of New York, citizens of the United States of America, have invented certain new and useful Improvements in Amusement-Vehicles, of which the following is a specification.

Our invention refers to certain novel and ingenious improvements in revolving amusement-carriages of a spherical type intended to be employed in recreation-parks and similar places where people gather for outdoor amusement, recreation, sports, and the like, the object of the invention being to simplify and perfect a form of apparatus of a somewhat sensational and highly-novel design, carrying passengers therein and whirling at a high rate of speed, as hereinafter described, so that in combination with appurtenances for producing many kinds of different and surprising effects it will serve to delight and thrill both its passengers and the onlookers; and the invention consists, essentially, in a foraminous or skeleton sphere or ball having two movements, one a movement bodily forward or in a right line and the other a movement of revolution on the axis of the ball, both movements occurring simultaneously or independently; and also the invention comprises various details of mechanism for producing the movements of the ball and various other details and peculiarities, substantially as will be hereinafter described and then more fully pointed out in the claims.

Figure 3:
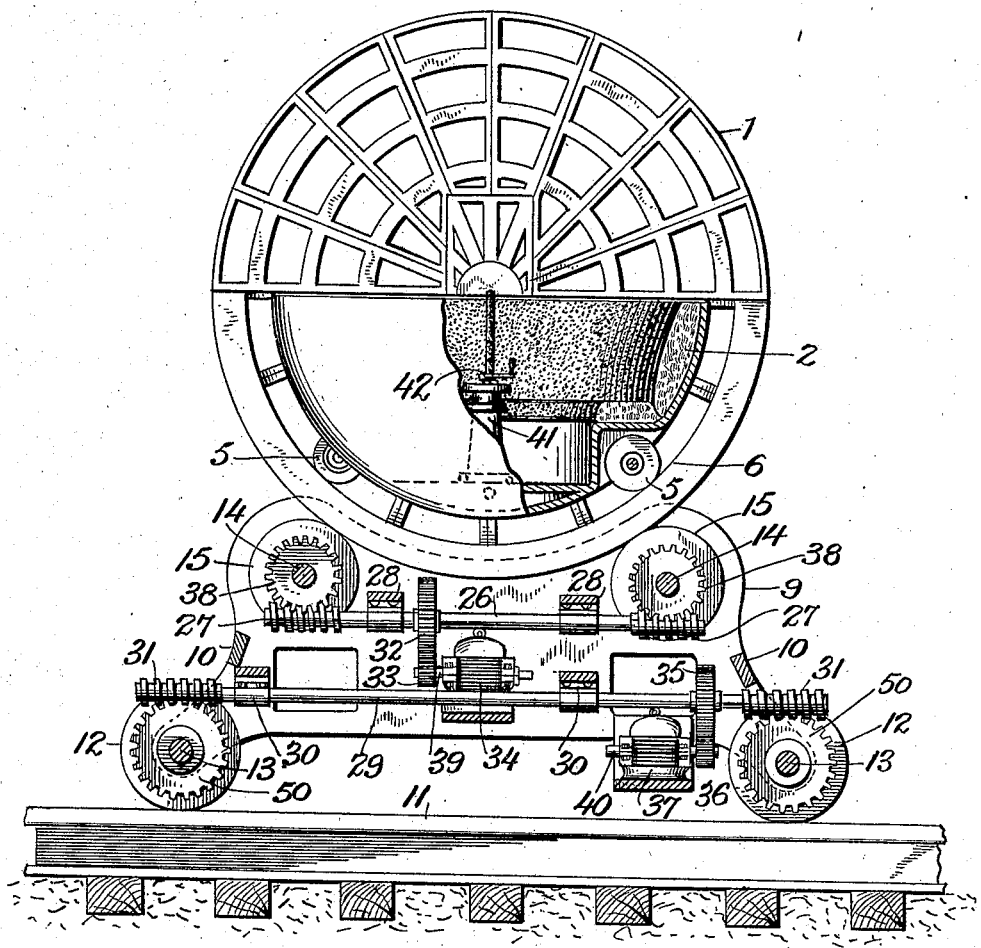
Figure 4:
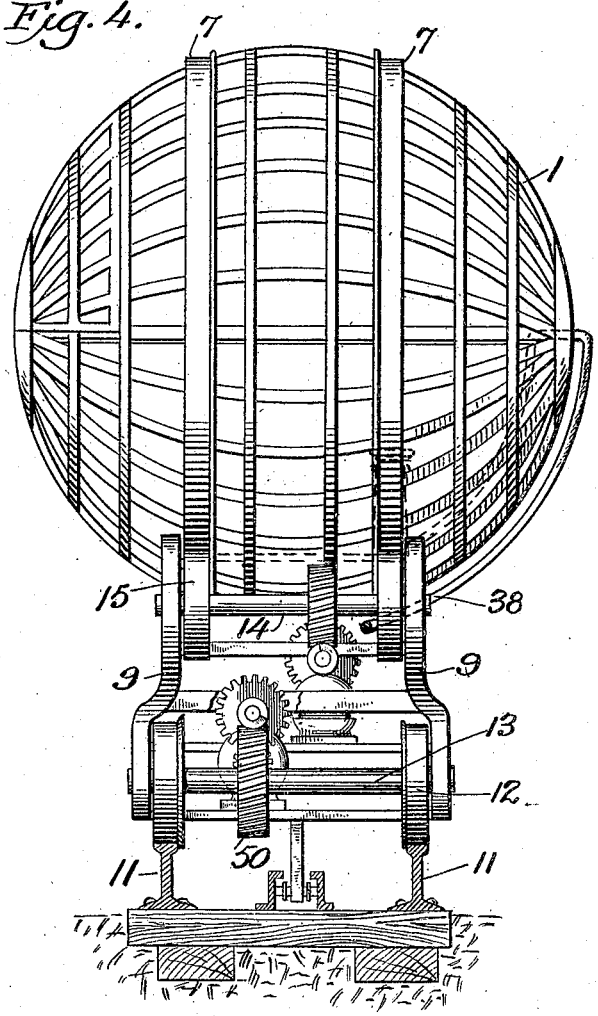
Figure 5:
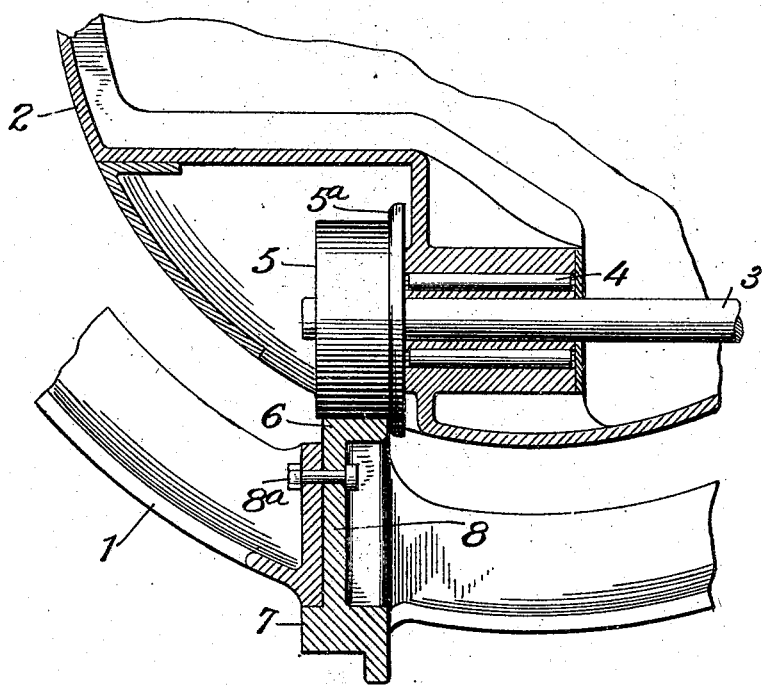
Figure 6:
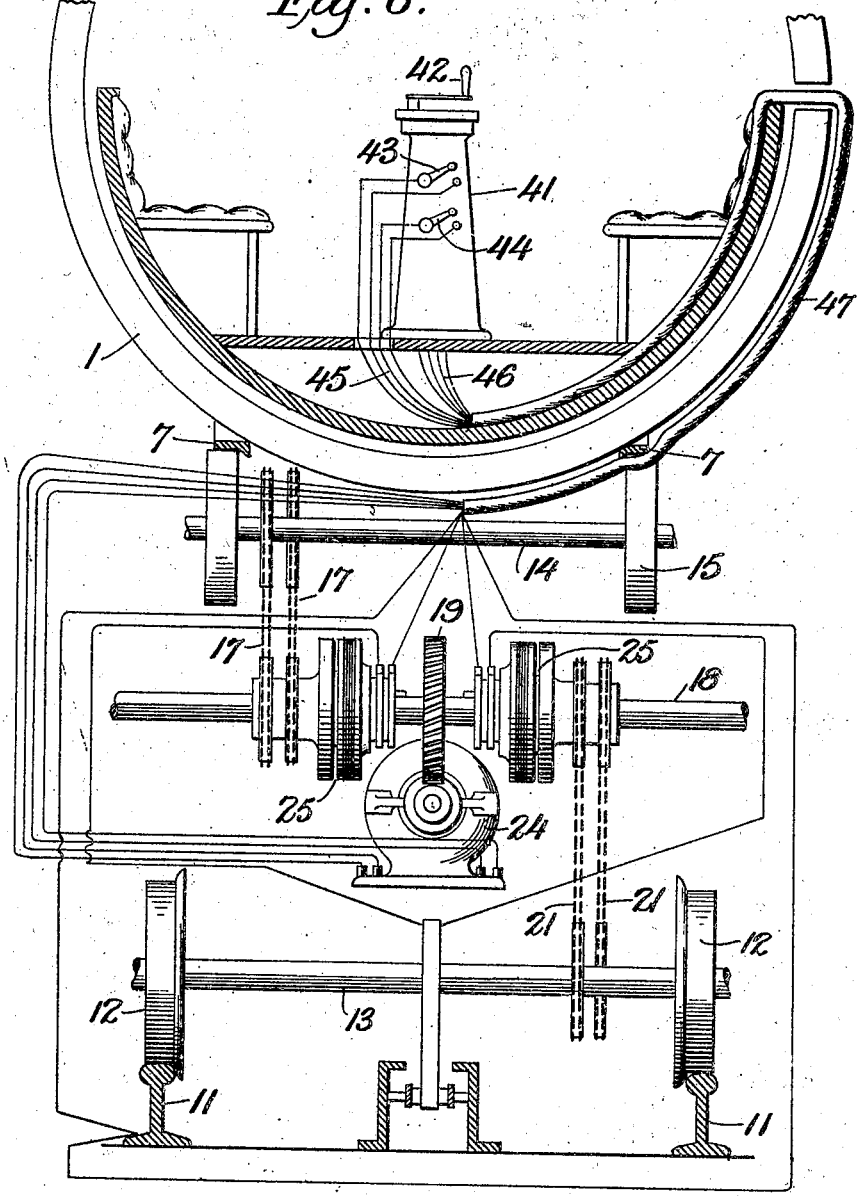

In the accompanying drawings, illustrating our invention, Figure 1 is a view, partly in side elevation and partly in section, of our improved amusement device. Fig. 2 is an end elevation of the same at right angles to the view in Fig. 1. Fig. 3 is a view, partially in side elevation and partially in section, similar to Fig. 1, but indicating a modification in the arrangement of the mechanism for accomplishing the movements of the ball. Fig. 4 is an end elevation at right angles to the view in Fig. 3 of the same mechanism as that delineated in the latter figure. Fig. 5 is an enlarged sectional detail showing the arrangement of trucks or wheels for the car within the ball. Fig. 6 is an enlarged and somewhat conventional illustration of that form of the invention shown in Figs. 1 and 2 and is a view in elevation, being intended to show more clearly the relative arrangement of some of the parts and indicate the wiring for carrying the electrical currents to perform the moving of the parts, as described.

Like numerals of reference denote like parts throughout the different figures of the drawings.

In some respects the ball or sphere employed as a part of our present amusement device is similar to that shown and described in the former Letters Patent granted to Herbert H. Pattee on ball-coaster, dated October 4, 1904, No. 771,322. The precise structure of the ball may vary within wide limits; but the example shown in the drawings at 1 is a convenient and preferable construction and consists, essentially, of a skeleton or foraminous shell, through interstices or openings in which persons riding within may readily gaze upon their surroundings.

Inside of the ball 1 is a car 2 for carrying passengers, said car being preferably of a semispherical form, the contour of the car conforming generally to the inner curvature of the ball 1; but the exact size and shape of this car may vary within wide limits. The car is in reality a bowl and may be termed a "bowl-car." It is provided with two parallel horizontal axles 3, supported in rollers or ball-bearings 4 and having on the ends trucks or wheels 5, provided with flanges 5ª, like ordinary car-wheels. These wheels 5 engage circular tracks 6 on the interior of the ball 1. On the exterior of the ball directly opposite to the interior circular track 6 are the exterior flanged rings 7, which are in form and effect wheel-rings and serve the purpose of parallel wheels on the exterior of ball 1.

In order to conveniently construct the inner circular rings 6 and the outer flanged rims 7, we find it convenient to insert in the frame of the ball 1 a circular ring of metal 8, occupying a position in a vertical plane and secured by means of bolts 8ª or otherwise to the frame of the ball 1, which ring 8 will provide, by means of its inner edge, the interior ring 6 on which the bowl-trucks 5 rest and the exterior flanged rim 7 (see Fig. 5;) but of course we do not desire to be restricted to this method of constructing and applying the inner and outer rims, but reserve the liberty of varying therefrom and constructing the same in different ways.

The ball 1 is supported by means of a carriage consisting, essentially, of parallel vertical sides 9 and suitable cross-pieces 10. This carriage is locomotive upon rolls or a track 11, and to that end is furnished with trucks 12, whose axles 13 are suitably journaled in the parallel sides 9 of the carriage-frame. In the carriage are also journaled horizontal parallel shafts 14, on which are rigidly secured wheels or rollers 15. The flanged wheel-rims 7 of the ball 1 engage the wheels 15. It is very obvious that the carriage by running on the track 11 can transport the ball from point to point and that in order to drive the carriage it is only necessary to actuate the trucks 12, and, furthermore, that in order to revolve the ball 1 on its axis it is only necessary to drive the friction wheels or rollers 15, the result of which will be to rotate the ball, and also that as the ball 1 rotates the bowl-car 2 therein will remain stationary without any possibility of overturning, inasmuch as the inner surface of the ball 1 or the edges of the rings 6 in contact with the car-trucks 5 will simply spin said wheels around, acting merely as an antifriction device between the frame of the ball and the car.

We have illustrated in the drawings two different ways of propelling the ball-carrying car along its track and also two different ways for revolving the friction-wheels 15, which results in the revolution of the ball. These different means, which are given as examples merely and for which other means may be substituted, we will now describe.

Referring to Figs. 1, 2, and 6, the friction-wheels 15 have their shafts 14 supported in the parallel side frames 9 of the ball-carrying car, and on these shafts 14 are sprocket or gear wheels 16, and on the axles 13 of the trucks 12 are also sprocket or gear wheels 22. Journaled in the side frames 9 centrally of the carriage in a horizontal position is a shaft 18, having thereon near one end a pair of sprocket or gear wheels 20, engaged by chains 17, which also pass around the wheels 16 on the shafts 14, and near the other end of this shaft 18 is another pair of sprocket-wheels 20ª, around which pass chains 21, which likewise encircle and engage the gear-wheels 22 on the axles 13. The chains 21 therefore serve to communicate motion from shaft 18 to the axles to propel the ball-carrying car, while the chains 17 transmit motion from the shaft 18 to the friction-wheels 15, and thus serve to actuate the ball and revolve it on its axis. On the shaft 18 also, at a point midway of its length, is a worm-wheel 19, meshing with which is a worm 23 on the shaft of an electric motor 24, which is suitably supported in the frame of the carriage. Thus it will be seen that this motor actuates the shaft 18, and the result of this actuation is to propel the ball-carrying car and also to rotate the ball, both of these operations being carried on either independently or concurrently, as desired.

In the car 2 inside ball 1 is a motor-controller 41, having a handle 42, said controller being of the usual type. On the side of the controller 41 are a couple of switches 43 and 44. The wires 45 leading from these switches and also the group of wires 46 leading from the inside of the controller are passed into a pipe 47, which runs from the stationary car 2 through a suitable opening in the center of ball 1 and then to the two clutches 25 25 on the shaft 18. These clutches need not be here described in detail, as they are well-known types of electric clutches, and we lay no claim thereto; but they are employed for the purpose of allowing the motion of the shaft 18 to be transmitted either to the propulsion-trucks or to the ball-revolving wheels, as may be desired. Thus, for instance, the switch 43 on the controller will control one of the clutches 25 and the switch 44 the other, so that the person operating the ball from the inside of the car which is within the ball may cause the ball-carrying carriage to move in either direction, this being determined by properly controlling the electric current, and may also control the revolution of the ball 1.

In Figs. 3 and 4 a modification in the mechanism for driving the ball-carriage, as well as the ball, is delineated. The shafts 14 of the friction-wheels 15 are provided each with a worm-wheel 38, and the axles 13 of the trucks 12 are each provided with a worm-wheel 50. 26 denotes a horizontal shaft supported in bearings 28 28, and 29 a similar horizontal shaft held in bearings 30 30. The shaft 26 has a worm 27 on each end thereof, which worms engage the gears 38, and the shaft 29 has a worm 39 at each end thereof, which engage the gear-wheels 50. 34 designates an electric motor whose shaft 39 has a pinion engaging a gear-wheel 32, which is on the shaft 26. 37 denotes another electric motor whose shaft 40 has a pinion 36 engaging a gear-wheel 35 on the shaft 29. Thus it will be seen that the motor 34 drives the friction-wheels 15 and the motor 37 drives the trucks 12 of the ball-carrying car or carriage. These motors are controlled by the controller 41, already spoken of as being in the bowl-car 2. We have not shown the wiring, as it is entirely unnecessary. Any suitable well-known type of electric motor may be employed.

The operation of our improved amusement device will be plainly evident from the foregoing description without further amplification, except to say that all the accessories and appurtenances which may contribute to the pleasure of the operation of a device of this kind—such as cloud effects, electric appliances for lighting, &c., stage simulations of thunder, and the like—may be used or applied in any desired manner.

Our device includes the idea of giving the ball at times a rectilineal or straight back-and-forth motion in one direction or the other for any distance and at any speed and either independently of or simultaneously with this motion bodily forward in one direction or the other, of imparting to the ball a rapid rotation, the interior car which carries the passengers being stationary relatively to the revolving sphere, so that the passengers are uninjured, but enjoy the sensation of the rapid rotation of the ball and the illusions produced as the result thereof, as seen by the passengers through the foraminous shell inclosing the bowl-car.

Many changes may be made in the exact construction and arrangement without departing from our invention.

Adverting to some changes which may be made from the disclosure herein described and illustrated, it is evident that both the ball-carrying car and the ball itself may be operated by suitable electric connections from without the ball as readily as by means of a controller within the ball. The inside control described and shown may be preferable, but the outside control is easily possible and may be found more convenient at certain times. Further, we wish to cover very broadly all possible means for imparting rotation to the ball. We do not wish to be restricted to revolving it by means of a friction-gear; but the friction-gear may at times become mere idle mechanism or idle wheels and a positive revolving action given to the ball in some other way either by gearing attached to the outer surface or by some device which will rotate it upon its axis. In the drawings we have shown the current derived from a shoe working in a slot, but other means for supplying it may be employed.

Having thus described our invention, what we claim as new, and desire to secure by Letters Patent, is—

1. In an amusement apparatus, the combination with a ball having an interior car carrying passengers, of means for transporting the ball.

2. In an amusement apparatus, the combination with a ball having an interior car carrying passengers, of means for transporting said ball bodily, and means for revolving it.

3. In an amusement apparatus, the combination with a ball carrying passengers, of a car for transporting it, and means consisting essentially of friction-wheels for revolving it.

4. In an amusement apparatus, the combination with a ball, of a relatively stationary car therein carrying passengers, and means for revolving the ball consisting of wheels in contact with the exterior.

5. In an amusement apparatus, the combination with a foraminous ball, of a car within the same carrying passengers, and trucks for said car in contact with the interior surface of the ball.

6. In combination with a revolving ball, having interior circular tracks, of a car within the ball carrying passengers, said car being provided with wheels engaging the said tracks.

7. The combination with a revolving ball carrying passengers, of a friction-gear applied to the exterior thereof for revolving the ball.

8. The combination with a ball carrying passengers, said ball so constructed that the passengers can see without, and having interior tracks, of a car provided with wheels engaging said tracks, which car remains stationary while the ball revolves about it, and means for revolving the ball, together with means for transporting it.

9. The combination of a revolving ball carrying passengers, a locomotive-car supporting the ball, means consisting essentially of friction-wheels for revolving the ball, and controlling means within the car together with an electric motor or motors whereby the ball may be revolved and whereby the car which supports it may be propelled.

10. The combination with a ball of a foraminous character and carrying passengers, of a car supporting the ball, wheels or rollers on the car on which the ball rests, and means for imparting revolution to the ball.

11. In an amusement-vehicle of the character described, the combination with a ball, a relatively stationary car within the same carrying passengers, a car supporting the ball, and an electric motor for revolving the ball.

12. The combination with a ball, of a relatively stationary car within the same, friction-wheels supporting the ball, and means for driving the friction-wheels for rotating the ball.

13. The combination with a ball carrying passengers, of friction-wheels supporting it, and means for rotating the ball.

14. The combination with a ball, of a relatively stationary car therein having trucks engaging interior tracks in the ball, flanged rims on the exterior of the ball, wheels on which said flanged rims rest, and means for rotating the wheels in order to rotate the ball.

15. The combination with a ball carrying passengers, of friction-wheels supporting it, and a car carrying said friction-wheels.

16. The combination with a ball carrying passengers, of friction-wheels supporting it, and means for rotating said wheels.

17. The combination with a ball carrying passengers, of friction devices supporting it, and means for actuating said devices to revolve the ball.

18. The combination of a revolving ball carrying passengers, a car supporting the ball, means consisting essentially of friction-wheels for revolving the ball, and means within the ball for controlling the revolution of the ball and the movement of the car.

19. The combination of a revolving ball carrying passengers, a car supporting the ball, means consisting essentially of revolving friction devices for revolving the ball, a motor or motors for revolving the ball and propelling the car, and means within the ball for controlling the motor or motors.

20. In an amusement apparatus, the combination with a ball carrying passengers, of means for transporting said ball, a motor or motors for revolving the ball and for propelling the transporting means, and means within the ball for controlling the motor or motors.

21. In an amusement apparatus, the combination with a foraminous ball, of a car within the same carrying passengers, a friction-gear applied to the exterior of the ball for revolving it, a car for transporting the ball, and a motor or motors whereby said ball is revolved and said car propelled.

22. The combination of a foraminous ball, a car within the same carrying passengers, said car having trucks in contact with the interior surface of the ball, friction-wheels supporting the ball, and means for actuating the friction-wheels, including a motor or motors and shafting, which latter communicates motion to the wheels.

23. In an amusement apparatus, the combination of a ball, an interior car carrying passengers and having trucks in contact with the interior surface of the ball, and means for revolving said ball around its axis.

Signed at New York city, New York, this 22d day of May, 1905.

HERBERT H. PATTEE.
CHARLES L. DUENKEL.

Witnesses:
   JOHN H. HAZELTON,
   I. HEIBERG.